April 22, 1958 R. M. WOYTYCH 2,831,386
CONTINUOUS FEED FACING ATTACHMENT FOR MACHINE TOOLS
Filed Nov. 7, 1952 5 Sheets-Sheet 1

INVENTOR
Raymond M. Woytych
Carlson, Pitzner, Hubbard & Wolfe
ATTORNEY

April 22, 1958 R. M. WOYTYCH 2,831,386
CONTINUOUS FEED FACING ATTACHMENT FOR MACHINE TOOLS
Filed Nov. 7, 1952 5 Sheets-Sheet 2

INVENTOR
Raymond M. Woytych
Carlson, Pitzner, Hubbard & Wolfe
ATTORNEY

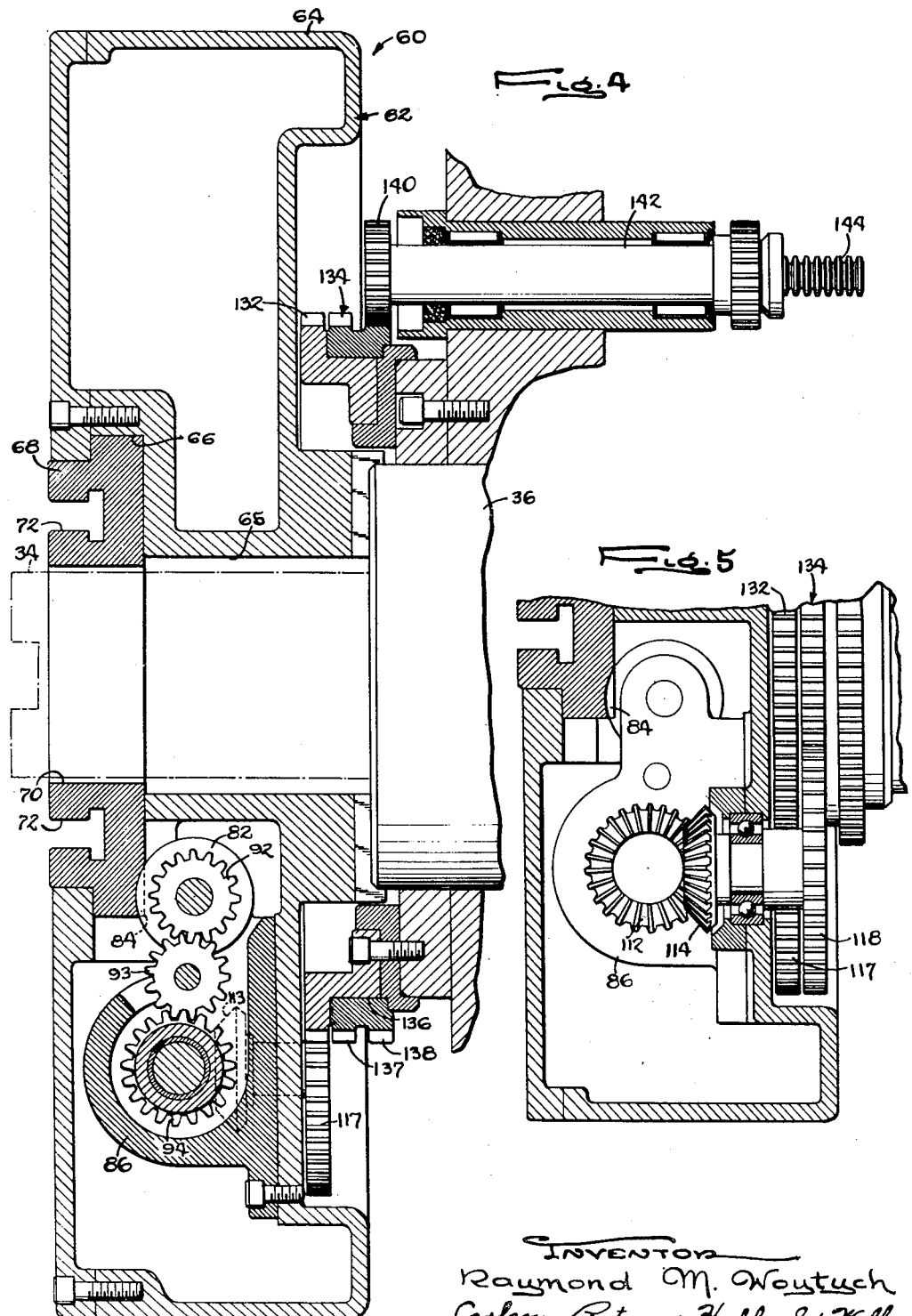

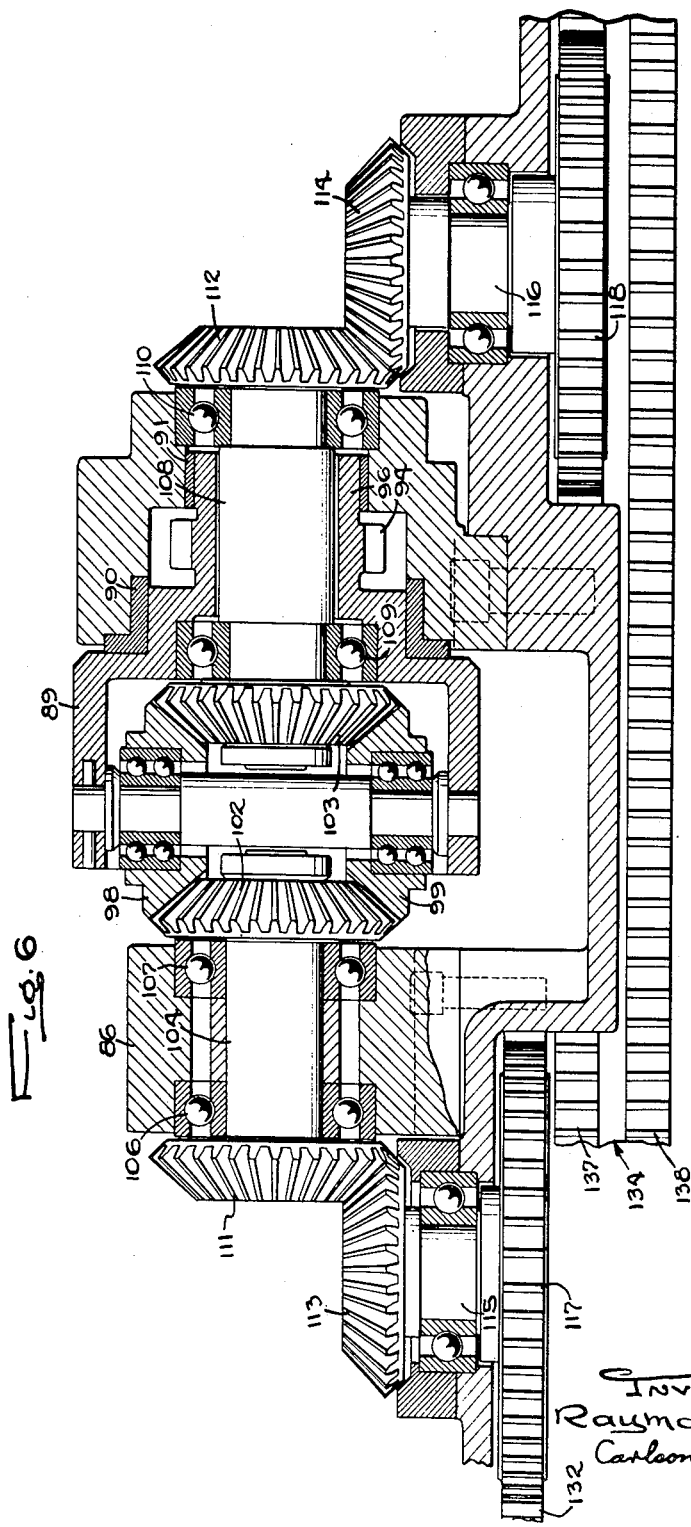

April 22, 1958 R. M. WOYTYCH 2,831,386
CONTINUOUS FEED FACING ATTACHMENT FOR MACHINE TOOLS
Filed Nov. 7, 1952 5 Sheets-Sheet 5

United States Patent Office 2,831,386
Patented Apr. 22, 1958

2,831,386
CONTINUOUS FEED FACING ATTACHMENT FOR MACHINE TOOLS

Raymond M. Woytych, Fond du Lac, Wis., assignor to Giddings & Lewis Machine Tool Company, Fond du Lac, Wis., a corporation of Wisconsin Application November 7, 1952, Serial No. 319,318

2 Claims. (Cl. 82—2)

This invention relates to improvements in machine tools, and has particular reference to a novel facing attachment which is especially adapted for use with horizontal boring, drilling, and milling machines.

A general aim of the present invention is to provide a new and improved facing attachment which may be employed, in conjunction with a tool headstock, such as that of a horizontal boring, drilling and milling machine, to carry out a continuous feed facing operation in which a facing tool is simultaneously rotated and fed transversely so that it is adapted to move in a spiral path over a surface being faced.

A more specific object is to provide a facing attachment having a power-operated tool feeding mechanism which is so constructed that the direction of feed and the feed rate may readily be changed while the tool is rotating. A related object is to provide a facing attachment in which provision is made for positioning and feeding the tool manually while the tool is rotating.

A further object is to provide a facing attachment which provides a large number and a wide range of feed rates. In this connection, it is a further object to provide a facing attachment, for use with a horizontal boring, drilling and milling machine or the like, in which the spindle feeding mechanism of the boring machine is utilized to feed the facing tool, so that the latter may be fed at a variety of feed rates, corresponding respectively to the spindle feed rates.

Another object is to provide a facing attachment comprising a rotatable facing head which contains differential gearing, utilized in feeding the facing tool at a rate which is not directly dependent on the rotary speed of the facing head.

A further object is to provide a facing attachment which is so constructed that only a few simple modifications will be required in existing horizontal boring, drilling and milling machines, to utilize the attachment.

Another object is to provide a facing attachment, for use on a horizontal boring, drilling and milling machine or the like, in which most of the components required for facing are contained in a detachable, rotatable facing head, salable as a separate unit for convenient application to existing machines lacking such attachment.

Other objects and advantages of the invention will appear from the following description of an illustrative embodiment thereof, taken with the accompanying drawings in which:

Fig. 4 is a broken line sectional view taken generally as indicated along line 4—4 in Fig. 2.

Fig. 5 is a fragmentary sectional view taken generally as indicated along line 5—5 in Fig. 2.

Fig. 6 is a fragmentary enlarged sectional view, taken generally as indicated along line 6—6 in Fig. 2, showing details of a differential gear unit which is employed in the feed mechanism.

Fig. 7 is a fragmentary sectional view, taken generally as indicated along line 7—7 in Fig. 2 of a portion of the feed mechanism.

Fig. 8 is a fragmentary enlarged sectional view, taken generally as indicated along line 8—8 in Fig. 2, and showing an arrangement for locking the feed mechanism out of operation.

Fig. 9 is a diagrammatic view showing the overall arrangement of the facing attachment.

Figure 1:
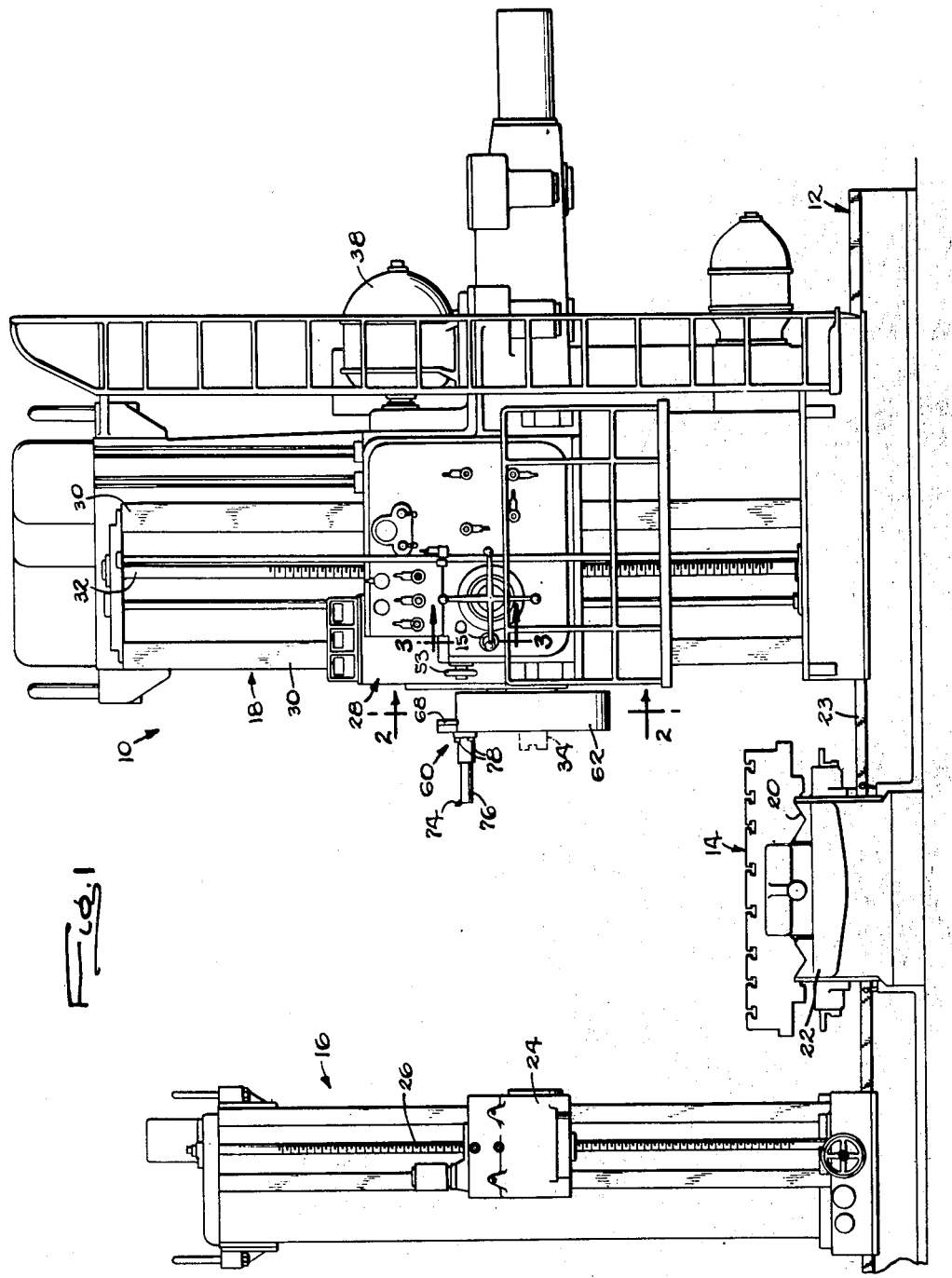
Fig. 1 is a front elevational view of an exemplary horizontal boring, drilling and milling machine equipped with a facing attachment embodying the features of the present invention.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

For purposes of exemplification, the invention has been shown herein (Fig. 1) as embodied in a horizontal boring, drilling and milling machine 10. Such machines are provided in various forms. As illustrated, the machine is of the general type shown in Gallimore Patent No. 2,251,015, to which reference may be had for a disclosure of various details of the machine which, in themselves, are not directly pertinent to the present invention. For the present purpose, it will suffice to say that the machine 10 comprises an elongated horizontal bed 12 above which a worktable 14 is located. At opposite sides of the table 14 are an adjustably mounted tailstock column 16 and a headstock column 18.

The worktable 14 is slidable in a direction transverse to the bed along ways 20 fashioned on the top of a saddle 22, which is in turn slidable along ways 23 on the bed 12. A suitable mechanism (not shown) is provided for selectively transversing the table 14 and the saddle 22 along their respective ways.

On the tailstock column 16 is a vertically slidable tailstock 24 which may be traversed along the column by means of a vertical feed screw 26.

At the opposite end of the machine, a headstock 28 is slidably mounted on vertical ways 30 formed on the front face of the headstock column 18. The headstock may be traversed along the headstock column by means of a vertical feed screw 32. A suitable mechanism (not shown) is provided to operate the feed screws 26 and 32 simultaneously so that the tailstock 24 and the headstock 28 will be traversed along the columns in horizontally alined relationship.

Rotatable in the headstock 28, and projecting from the left end thereof, is a main horizontal tool spindle 34, which extends through and is splined for axial movement in a rotatable sleeve 36 (Fig. 4). Thus, the sleeve constitutes a drive member for the spindle. Power to drive the sleeve is provided by an electric motor 38 mounted on the headstock 28. The latter contains a suitable speed change mechanism (not shown) for connecting the motor to the sleeve.

Axial feeding movement of the spindle 34 is adapted to be accomplished by suitable means, which may include a rack and pinion mechanism (not shown), driven by a shaft 40 (Fig. 9). Mounted on the latter is a bevel gear 42, meshing with a second bevel gear 44. A clutch 46 forms a disengageable driving connection between the gear 44 and a wormwheel 48. The clutch may be constructed in the manner shown and described in the above-mentioned Gallimore patent. Meshing with the wormwheel is a worm 50 mounted on a shaft 52, which projects from the headstock and is provided with a handwheel 53, whereby the axial position of the spindle may be adjusted manually. To provide for power feed of the spindle, the headstock is equipped with a speed change mechanism (not shown) for connecting the motor 38 to a gear 54 on the shaft 52. This mechanism may be constructed as disclosed in the Gallimore patent, mentioned above, so as to provide a large number of different feed rates covering a wide range. It should be noted that directional controls are embodied in the mechanism so that the spindle may be fed in either direction, as desired. A rapid traverse mechanism is also provided to rotate the feed shaft 52 at a relatively high speed so that the spindle may be positioned quickly.

Figure 2:
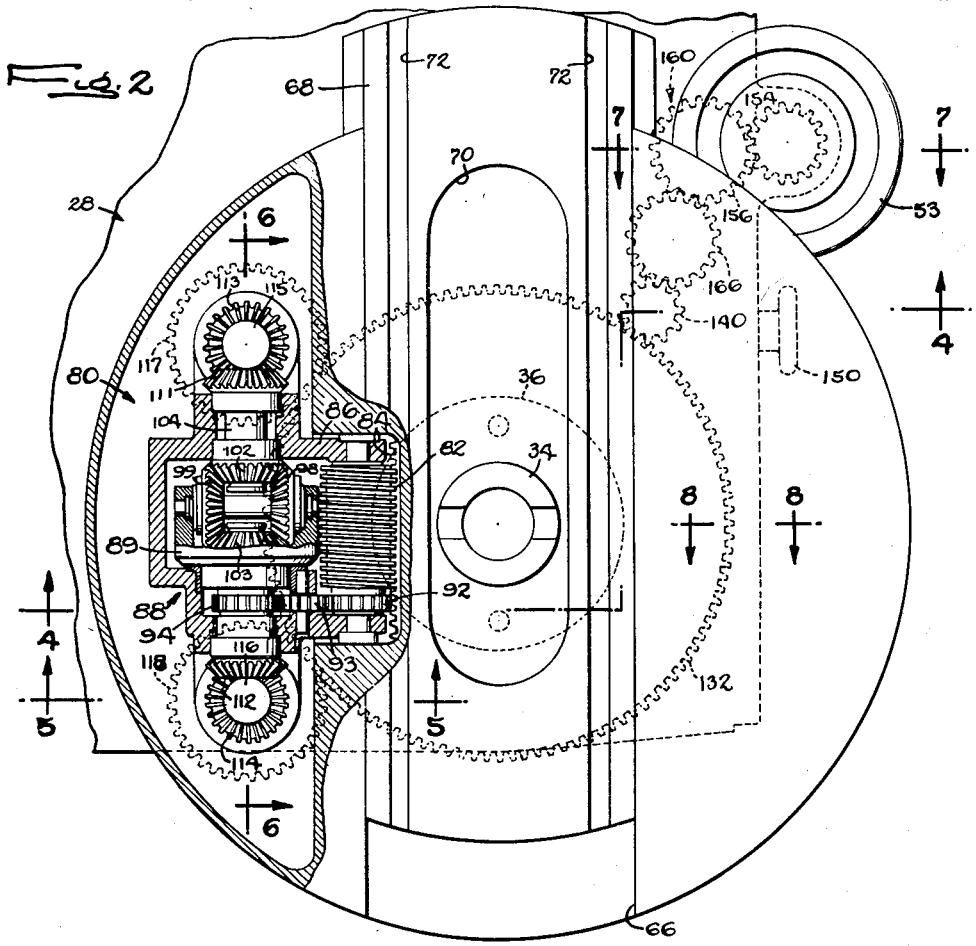
Fig. 2 is a side elevational view of the facing attachment, partly in section generally along line 2—2 in Fig. 1, so as to show details of the feed mechanism.

The headstock 28 is provided with a novel facing attachment 60 (Fig. 4), comprising a facing head 62 fixed on the forward or left-hand end of the sleeve 36, for rotation therewith. In its illustrative form, the facing head 62 comprises a generally cylindrical, drum-shaped housing 64 arranged coaxially with the sleeve 36 and having its rear face bolted to the latter. Formed in the housing is a central opening 65 through which the spindle 34 extends so that the latter may be used for boring operations without interference from the facing head 62. Extending diametrically across the front face of the housing 64 are diametrical ways 66 (Figs. 2 and 4) on which a tool slide 68 is slidably mounted for endwise movement in a path transverse to and intersecting the axis of rotation of the housing. An elongated central slot 70 is fashioned in the slide to receive the projecting end of the spindle 34 so that the slide may be moved freely along the ways without interference with the spindle. The face of the slide is provided with T-slots 72 so that various boring or facing tools may readily be fastened thereto. For example, in Fig. 1, a facing tool 74 is shown mounted on a facing tool support 76 which is secured to the slide 68 by bolts 78 having their heads in the T-slots.

Facing is accomplished, in the present machine, by moving the facing tool 74 across a workpiece surface in a spiral path so as to cover progressively the area to be faced. For this purpose, provision is made for feeding the tool slide 68 along the ways 66 as the housing 64 is rotated by the spindle sleeve 36. This is accomplished, in the present instance, by means of a feeding mechanism 80 (Fig. 2), including a worm pinion 82 which meshes with a rack of segmental nut 84 formed on one side edge of the tool slide. The pinion 82 is journaled in a U-shaped frame 86 secured to the housing 64. In driving relation with the worm pinion 82 is a differential gear unit 88, including a rotatable planet carrier 89 which is journaled in plain bearings 90 and 91 (Fig. 6), supported by the frame 86. A gear 92 on the worm pinion 82 meshes with an idler pinion 93 journaled in the frame 86. In mesh with the idler pinion 93 is a gear 94 formed on a hollow shaft-like portion 96 (Fig. 6) of the planet carrier. Journaled on the planet carrier are a pair of planetary bevel gears 98 and 99, meshing with opposed differential drive gears 102 and 103, disposed coaxially with respect to the planet carrier. The drive gear 102 is mounted on a shaft 104 which is journaled in the frame 86 by means of a pair of ball bearings 106 and 107. Supporting the other drive gear 103 is a shaft 108 extending axially through the hollow shaft portion 96 of the planet carrier and journaled therein by means of a ball bearing 109. The outer end of the shaft 108 is journaled in a ball bearing 110 carried by the frame 86.

Provision is made for driving the differential gears 102 and 103 in opposite directions at speeds which may be different or equal. If the speeds of the gears are caused to be different, the planet carrier 89 will rotate in the direction of the more rapidly rotating gear, and at a speed equal to one-half the difference between the speeds of the gears. If the speeds of the two gears 102 and 103 are made equal, the planet carrier will remain stationary.

In the illustrated embodiment, the differential drive shafts 104 and 108 are provided with respective bevel gears 111 and 112, meshing respectively with bevel gears 113 and 114 mounted on a pair of transverse shafts 115 and 116. Secured to these respective shafts are gears 117 and 118, which are disposed in planetary relation to the rotary axis of the facing head. As shown, the arrangement of the bevel gears 111, 112, 113 and 114 is such that rotation of the planetary gears 117 and 118 in the same direction will effect rotation of the differential drive gears 102 and 103 in opposite directions.

To drive the planetary gears 117 and 118, a pair of ring-shaped sun gears 132 and 134 (Fig. 4) are mounted adjacent each other on the headstock housing, in coaxial relationship with the spindle sleeve 36. The planetary gears 117 and 118 are offset in an axial direction, relative to each other, so as to mesh with their respective sun gears. Accordingly, the planetary gears will roll around the sun gears as the facing head 62 rotates. If the sun gears are stationary, the planetary gears will be rotated at equal speeds, and the tool slide 68 will remain stationary. The same result would be obtained if both sun gears were to be rotated at equal speeds. However, any difference in the speeds of the sun gears will result in a correlative feeding movement of the tool slide.

Figure 3:
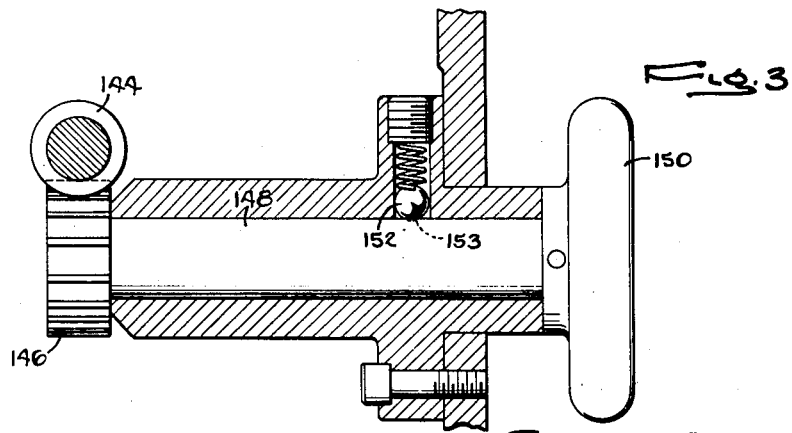
Fig. 3 is a fragmentary vertical sectional view taken generally along the line 3—3 in Fig. 1.

Provision is made for effecting relative rotation of the sun gears 132 and 134. As shown, the sun gear 132 is bolted to the headstock housing, and thus is stationary. Formed on the gear 132 is a reduced cylindrical extension 136, on which the other gear 134 is rotatably carried. The latter is provided with two adjacent sets of gear teeth 137 and 138, the former of which meshes with the planetary gear 118. A drive pinion 140 is adapted to mesh with the other gear teeth 138. The pinion 140 is mounted on a longitudinally slidable shaft 142 journaled in the headstock housing. By sliding the shaft 142, the pinion 140 may be moved into and out of mesh with the sun gear 134. Such sliding movement of the shaft may be effected by means of an annular rack 144 thereon, which meshes with a pinion 146 (Fig. 3) fixed on a rotatable shaft 148. The latter is provided with a hand control wheel 150 disposed in front of the headstock housing. Engaging the shaft 148 is a spring-pressed detent ball 152, which cooperates with recesses 153 in the surface of the shaft, so as to hold the pinion 140 in its engaged or disengaged position as desired.

Provision is made for connecting the shaft 142 to the spindle feed mechanism in the headstock 28, so that all of the selective spindle feed rates may be utilized in traversing the tool slide 68 of the facing head. With this arrangement, the directional controls of the spindle feed mechanism will also be available to control the direction of operation of the tool slide. In the illustrated machine, connection is made to the spindle feed mechanism by means of a gear 154 (Fig. 7) on the spindle feed shaft 52. Meshing with the gear 154 is an idler gear 156. An adjacent idler gear 158 is connected to the gear 156 by means of an overload clutch 160 comprising interengaging detent teeth 162 and spring pressed detent balls 164 carried by the respective gears 156 and 158. In case of an overload, the clutch will slip and thus prevent damage to the feed gearing. Meshing with the idler gear 158 is an idler gear 166 (Fig. 9), which is disposed so as to mesh with a pinion 170 fixed on the shaft 142, the pinion 170 and the gear 166 being in mesh when the shaft 142 is so positioned that the pinion 140 is in mesh with the sun gear 134.

In the exemplary machine, the overall gear ratio of the feeding mechanism for the tool slide 68 is such that the latter is fed at one-half the rate indicated by the setting of the feed rate controls on the spindle feed mechanism. In this way the spiral described by the facing tool will change in diameter at a rate equal to the indicated feed rate.

Provision is made for locking the feed mechanism of the facing attachment, so as to prevent feeding movement of the tool slide 68. Thus, the tool slide may be held in a fixed relationship to the housing 64, when operations such as boring, drilling or tapping are to be carried out, rather than facing. To this end, a clamping device 174 (Fig. 8) is provided on the headstock 28 to hold the sun gear 134 stationary. Without such a clamping device, there would be a tendency for the sun gear to be dragged along by the planetary gear 118. In its illustrated form, the clamping device comprises a lever 176 which is mounted on the headstock 28 by means of a pivot 178. The lever has a pair of arms 180 and 182, the former of which is provided with a friction surface 184 adapted to engage the periphery of the gear 134. A spring-pressed plunger 186 is mounted in the lever arm 180 to bias the friction surface 184 away from the gear 134. Carried by the other lever arm 182 is a thumb screw 188 which may be utilized to clamp the friction surface 184 against the gear 134.

While the operation of the illustrative embodiment will be clear from the foregoing description, it will be summarized briefly. In preparation for a facing operation, the pinions 140 and 170 may be moved into mesh with the gears 134 and 166, respectively, by turning the hand wheel 150 so as to shift the shaft 142 to the left, as seen in Fig. 4. The feed mechanism of the facing attachment may be unlocked by loosening the thumb screw 188 of the clamping device 174. Unless a boring operation is to be carried on simultaneously with the facing operation, the clutch 46 will be disengaged so as to disconnect the spindle from the spindle feeding mechanism. Adjustment of the tool slide 68 to a desired initial position may then be accomplished by rotating the hand wheel 53. A suitable feed rate may be selected by setting the controls of the spindle feeding mechanism. Likewise, the directional controls of this mechanism may be adjusted so that the tool slide will be traversed in the desired direction. Finally, the spindle feed mechanism may be set into operation so as to rotate the shaft 52.

All of these operations may be carried out while the facing head is either rotating or stationary. In either case, rotation of the shaft 52 will produce corresponding feeding movement of the tool slide 68 relative to the housing 64. The rotation of the shaft 52 will be transmitted to the shaft 142 by means of the gear train 154, 156, 158, 166 and 170. Rotation of the sun gear 134 will be effected by the pinion 140 on the shaft 142.

If the facing head 62 is stationary, the planetary gear 118 will be driven by the rotating sun gear 134, while the other planetary gear 117 will remain stationary. As a result the differential gear 103 will rotate while the differential gear 102 will remain stationary. The planet carrier 89 will accordingly rotate at half the speed of the gear 103, and the resulting rotation of the worm 82 will advance the slide 68 along the ways 66.

If the facing head 62 is rotating, both of the planetary gears 117 and 118 will roll around the respective sun gears 132 and 134, at speeds which will differ in accordance with the speed and direction of the rotation of the sun gear 134. Through the gear trains 111, 113 and 112, 114 the differential gears 102 and 103 will be driven in opposite directions at speeds corresponding to those of the gears 117 and 118. The planet carrier 89 will be driven at a speed equal to one-half the difference in the speeds of the gears 102 and 103, and in a direction corresponding to that of the more rapidly rotating gear 102 or 103. Thus, the tool slide 68 will be fed at a speed and in a direction corresponding to the speed and direction of the rotation of the sun gear 134.

If it is desired to stop the feeding movement of the tool slide 68, the spindle feeding mechanism of the headstock 28 may be stopped, and the sun gear 134 locked by engaging the clamp 174. The pinion 140 may be disengaged from the gear 134 by turning the hand wheel 150, whereupon the spindle feed mechanism may be employed for its normal purpose of feeding the spindle.

With the gear 134 stationary, the planetary gears 117 and 118 are driven at equal speed as they roll around the gears 132 and 134. As a result, the speeds of the differential drive gears 102 and 103 are equal, and the planet carrier 89 is stationary, relative to the housing 64, although the planets 98 and 99 rotate idly. Accordingly, there is no feeding movement of the tool slide 68 along the ways 66. Under these conditions the facing head 62 may be employed for boring and turning operations, by mounting suitable tools on the slide 68 and feeding the saddle 22 along the ways 23.

With the facing attachment of this invention, all of the speed change gearing for obtaining multiple facing feed rates may be contained in the headstock rather than in the rotary facing head. In this way the size, weight and cost of the facing head may be kept to a minimum, without any sacrifice in flexibility or convenience of operation.

A facing attachment according to this invention is well adapted for use on the headstock of a horizontal boring, drilling and milling machine, because the spindle feed mechanism of the headstock may be employed to operate the feed mechanism of the facing attachment. Only a few simple components need be added to the headstock for this purpose, so that the cost of the headstock will not be greatly increased. The rotatable facing head may be sold as a separate relatively inexpensive unit.

I claim as my invention:

1. A facing attachment for use on a machine tool having a rotatable drive member comprising, in combination, a hollow generally cylindrical housing adapted to be mounted at one end of the drive member for rotation with the member, a ring gear adapted to be stationarily supported at the rear of said housing in coaxial alinement with the housing, a second ring gear rotatably supported on said stationary ring gear and adapted to be driven independently of the drive member, a tool slide supported on the outer end face of said housing for feeding movement transversely of the rotational axis of the housing, and means for imparting feeding movements to said tool slide comprising a differential gear unit mounted within said housing, including a pair of axially alined drive gears supported in spaced face-to-face relation, a planet carrier supported for rotation about the same axis as said drive gears, planet gears on said carrier meshing with both of said drive gears, a feed pinion operative when rotated to impart feeding movements to the tool slide, gearing drivingly connecting said planet carrier with said pinion, and gearing operative to drive said drive gears respectively from said ring gears.

2. A facing attachment for use on a machine tool having a rotatable spindle driving member and spindle feed mechanism including a rotatably driven shaft, said attachment comprising, in combination, a hollow generally cylindrical housing adapted to be mounted coaxially on the drive member for rotation with the member, a ring gear adapted to be stationarily supported coaxially of the drive member adjacent the rear face of said housing, a second ring gear rotatably supported on said stationary gear and adapted to be driven by the feed mechanism shaft, a tool slide supported on the front face of said housing for feeding movement transversely of the rotational axis of the housing, said slide having a toothed rack positioned within said housing, mechanism for imparting feed movements to said slide including a differential gear unit supported within said housing, said unit including a pair of drive gears driven respectively from said ring gears, a rotatable carrier supporting a planet gear in meshing engagement with both of said drive gears, and a feed pinion connected to be driven by said carrier and meshing with said feed rack.

References Cited in the file of this patent

UNITED STATES PATENTS

| | | |
|---|---|---|
| 584,422 | Smith | June 15, 1897 |
| 1,994,879 | Tweit | Mar. 19, 1935 |
| 2,269,641 | Woytych | Jan. 13, 1942 |
| 2,345,060 | Morton | Mar. 28, 1944 |
| 2,367,555 | Arney | Jan. 16, 1945 |
| 2,457,533 | De Huff | Dec. 28, 1948 |
| 2,554,207 | Pegard | May 22, 1951 |